(12) United States Patent
Hirai

(10) Patent No.: US 6,577,805 B1
(45) Date of Patent: Jun. 10, 2003

(54) PICTURE RECORDING AND REPRODUCING APPARATUS AND METHOD

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/193,602

(22) Filed: Nov. 17, 1998

(30) Foreign Application Priority Data

Nov. 19, 1997 (JP) .............................................. 9-318495
Jun. 30, 1998 (JP) ........................................... 10-185246

(51) Int. Cl.⁷ .............................. H04N 7/00; H04N 5/91
(52) U.S. Cl. ......................................... 386/46; 386/65
(58) Field of Search ................................ 386/4, 52, 53, 386/64–65, 46; 360/13; 369/83; 348/594–595, 598, 700–701

(56) References Cited

U.S. PATENT DOCUMENTS

| | | | | |
|---|---|---|---|---|
| 4,591,931 A | * | 5/1986 | Baumeister | 360/72.1 |
| 4,644,400 A | * | 2/1987 | Kouyama et al. | 348/512 |
| 5,111,288 A | * | 5/1992 | Blackshear | 348/143 |
| 5,392,166 A | * | 2/1995 | Furuya et al. | 386/96 |
| 5,481,411 A | * | 1/1996 | Nakatani | 386/4 |
| 5,485,611 A | * | 1/1996 | Astle | 707/1 |
| 5,600,370 A | * | 2/1997 | Furuyama | 348/239 |
| 5,621,536 A | * | 4/1997 | Kizu | 386/52 |
| 5,627,765 A | * | 5/1997 | Robotham et al. | 708/203 |
| 5,805,733 A | * | 9/1998 | Wang et al. | 382/232 |
| 5,825,413 A | * | 10/1998 | Mullis | 348/155 |
| 5,832,173 A | * | 11/1998 | Terasawa et al. | 386/69 |
| 5,852,438 A | * | 12/1998 | Tomizawa et al. | 345/328 |
| 5,937,136 A | * | 8/1999 | Sato | 386/52 |
| 6,157,771 A | * | 12/2000 | Brewer et al. | 386/69 |
| 6,236,802 B1 | * | 5/2001 | Yamamoto | 386/52 |

* cited by examiner

*Primary Examiner*—Andrew Christensen
*Assistant Examiner*—Polin Chieu
(74) *Attorney, Agent, or Firm*—Frommer Lawrence & Haug LLP; William S. Frommer; Stephen J. Lieb

(57) ABSTRACT

In a recording mode, an image signal of a desired object is generated by an imaging unit such as a video camera, and the time difference between the hour of generation of the current image signal and the hour of generation of a preceding image signal is detected by a system controller. Then the image signal and predetermined data based on the result of detection of the time difference are recorded on a recording medium via an optical pickup section. In a reproduction mode, the predetermined data are read out from the recording medium together with the image signal representing the picture of the object, and a predetermined video effect is applied to the read image signal in accordance with the predetermined data. Thus, a multiplicity of pictures shot under any different conditions by a video camera or the like can be reproduced without incongruous appearances respectively

63 Claims, 5 Drawing Sheets

| DATE | SEQUENCE NO. | CUT NO. | SHOT NO. | RECORDING START HOUR | RECORDING END HOUR | RECORDING HOUR | ADDRESS | SCENE NO. | USER AREA |
|---|---|---|---|---|---|---|---|---|---|
| 0MONTH 0DAY, 1997 | 1 | C1 | | 8:50 | 9:10 | | A000~A999 | ① | SCENE INTERVAL : 30 MIN. |
| | 2 | | S1 | | | 9:25 | B000~B222 | | |
| | 3 | | S2 | | | 9:30 | B333~B555 | | |
| | 4 | | S3 | | | 9:35 | B666~B800 | | |
| | 5 | C2 | | 11:45 | 12:10 | | B888~C999 | ② | |
| | 6 | C3 | | 12:30 | 12:40 | | D000~D999 | | |
| | 7 | | S4 | | | 14:40 | E000~E222 | ③ | |
| | 8 | | S5 | | | 14:45 | E333~E555 | | |
| | 9 | | S6 | | | 14:50 | E666~E888 | | |
| | 10 | C4 | | 19:00 | 19:15 | | E999~F999 | ④ | |

| DATE | SEQUENCE NO. | CUT NO. | SHOT NO. | RECORDING START HOUR | RECORDING END HOUR | RECORDING HOUR | ADDRESS | SCENE NO. | USER AREA |
|---|---|---|---|---|---|---|---|---|---|
| ○MONTH ○DAY, 1997 | 1 | C1 | | 8:50 | 9:10 | | A000 ~A999 | ① → | SCENE INTERVAL : 30 MIN. |
| | 2 | | S1 | | | 9:25 | B000 ~B222 | | |
| | 3 | | S2 | | | 9:30 | B333 ~B555 | | |
| | 4 | | S3 | | | 9:35 | B666 ~B800 | | |
| | 5 | C2 | | 11:45 | 12:10 | | B888 ~C999 | ② → | |
| | 6 | C3 | | 12:30 | 12:40 | | D000 ~D999 | ③ → | |
| | 7 | | S4 | | | 14:40 | E000 ~E222 | | |
| | 8 | | S5 | | | 14:45 | E333 ~E555 | | |
| | 9 | | S6 | | | 14:50 | E666 ~E888 | | |
| | 10 | C4 | | 19:00 | 19:15 | | E999 ~F999 | ④ | |

PICTURE RECORDING AND REPRODUCING APPARATUS AND METHOD

BACKGROUND OF THE INVENTION

The present invention relates to a picture recording apparatus and method, a picture reproducing apparatus and method, a picture recording/reproducing apparatus and method, and a recording medium which are capable of realizing natural reproduction of pictures with reduced incongruous appearances.

Due to the recent development and progress of the image processing technology, in a picture recording/reproducing apparatus, such as video cameras, it is possible now to achieve smooth reproduction of seamless pictures from a recording medium such as a tape or disk where moving pictures or still pictures are recorded successively.

Picture recording/reproducing apparatus such as video cameras currently available are equipped with a function to apply a special video effect of fade-in, fade-out or the like to a desired signal, and the signal is recorded with a process of fade-in, fade-out or the like executed by the above function at the start and end of shooting an object.

In the picture recording/reproducing apparatus known heretofore, operations are performed in such a manner that, in a recording mode, a fader button for example is depressed together with a recording button to thereby apply a special effect to an image signal and then the processed signal is recorded on a recording medium, and subsequently in a reproduction mode, the image signal is gradually faded in instead of being instantly turned up and then is gradually faded out at the end of the relevant image signal.

Meanwhile, in applying a special effect to recorded normal image signals, it has been customary according to the related art that two picture recording/reproducing apparatus such as video cameras or video tape recorders (VTRs) are prepared and, by the use of a device, a picture effector, for applying a special effect to the pictures in an editing mode, the pictures are edited while being dubbed between the two picture recording/reproducing apparatus. More concretely, a start point and an end point of a desired video signal are designated, and also a point and timing to generate a video effect by the picture effector are designated, and then video effects inclusive of fade-in and fade-out are applied by the picture effector with dubbing performed on the basis of such sequence data.

It is preferred that image signals representing the. contents recorded substantially in the same place and at the same time are reproduced seamlessly. However, if other image signals of totally different contents are reproduced seamlessly in succession to the preceding image signals, an unnatural impression may be given to a viewer with some incongruous feeling. For example, if the picture of a person shot in his house is suddenly changed to the picture of a quite different scene shot in his overseas journey, such abrupt change obviously brings about an unnatural impression.

According to the related art, it has been generally customary heretofore to avoid such a disadvantage by, in the above exemplary case, manipulating a fader button at the end of shooting in his house and/or at the beginning of a first recording operation in the overseas tour, or by editing the recorded contents in a dubbing mode using two picture recording/reproducing apparatus and a picture effector after complete termination of the recording on a recording medium, hence applying video effects of fade-in, fade-out and so forth at the changes of scenes.

However, when manipulating a fader button in a picture recording/reproducing apparatus, it is necessary, in a recording mode, to press both the recording button and the fader button, and this manipulation cannot be performed after completion of the recording on the recording medium. It is not exactly easy for the user to make a decision for pressing or not the fader button in the recording mode, and some intricate manipulation is concomitant therewith, so that this technique is not in practical use effectively. Meanwhile, the above method based on editing with dubbing after complete shooting necessitates preparation of expensive appliances and induces extreme intricacy with respect to installation, connection and manipulation of such appliances at the time of editing. Therefore, such method is adopted merely among a very small number of users in general homes.

SUMMARY OF THE INVENTION

The present invention has been accomplished in view of the circumstances mentioned. And it is an object of the present invention to provide a picture recording apparatus and method, a picture reproducing apparatus and method, a picture recording/reproducing apparatus and method, and a recording medium which are capable of realizing natural reproduction of pictures with reduced incongruous appearances with regard to picture signals recorded at various different places and times, while eliminating the necessity of performing any special manipulation in a recording mode and also the necessity of preparing particular expensive appliances.

In the present invention, the above object is achieved by detecting the time difference between the hour of generation of an image signal currently formed and the hour of generation of a preceding image signal, and then recording, on a recording medium, the image signal and predetermined data based on the result of such detection.

According to a first aspect of the present invention, there is provided a picture recording apparatus comprising: an imaging means for generating an image signal of a desired object; a time difference detection means for detecting the time difference between the hour of generation of the current image signal and the hour of generation of a preceding image signal; and a recording means for recording, on a recording medium, the image signal obtained from the imaging means and also predetermined data based on the result of detection by the time difference detection means.

According to a second aspect of the present invention, there is provided a picture recording method comprising the steps of: generating an image signal of a desired object; detecting the time difference between the hour of generation of the current image signal and the hour of generation of a preceding image signal; and recording, on a recording medium, the generated image signal and predetermined data based on the result of such detection.

In the present invention, the aforementioned object is achieved by applying a predetermined video effect to the video signal read out from a recording medium on the basis of predetermined data relative to the time difference read out from the recording medium.

According to a third aspect of the present invention, there is provided a picture reproducing apparatus comprising: a read means for reading, from a recording medium, predetermined data relative to the time difference between a recording end hour of at least one picture and a recording start hour of a next picture, together with the video signal of the relevant pictures; a video effect generation means for applying a predetermined video effect to the read video signal; and an effect control means for controlling the video effect generation means in accordance with the predetermined data relative to the time difference.

According to a fourth aspect of the preset invention, there is provided a picture reproducing method comprising the steps of: reading, from a recording medium, predetermined data relative to the time difference between a recording end hour of one picture and a recording start hour of a next picture, together with the video signal of the relevant pictures; and applying a predetermined video effect to the read image signal in accordance with the predetermined data relative to the time difference.

In the present invention, the object is achieved by detecting, in a recording mode, the time difference between the hour of generation of an image signal and the hour of generation of a preceding image signal and then recording, on a recording medium, the image signal and predetermined data based on the result of such detection; and in a reproduction mode, applying a predetermined video effect to the image signal read out from the recording medium on the basis of the predetermined data obtained from the recording medium.

According to a fifth aspect of the present invention, there is provided a picture recording/reproducing apparatus comprising: an imaging means for forming an image signal relative to the picture of a desired object; a time difference detection means for detecting the time difference between the hour of generation of the image signal thus formed and the hour of generation of the preceding image signal; a recording means for recording, on a recording medium, the image signal obtained from the imaging means and also predetermined data based on the result of detection by the time difference detection means; a read means for reading, from the recording medium, the predetermined data together with the image signal of the relevant picture; a video effect generation means for applying a predetermined video effect to the image signal thus read; and an effect control means for controlling the video effect generation means in accordance with the predetermined data.

According to a sixth aspect of the present invention, there is provided a picture recording/reproducing method comprising the steps of: forming an image signal of a desired object; detecting the time difference between the hour of generation of the current image signal and the hour of generation of a preceding image signal; recording, on a recording medium, the generated image signal and predetermined data based on the result of such detection; reading the predetermined data from the recording medium together with the video signal of the relevant picture; and applying a predetermined video effect to the read image signal in accordance with the predetermined data.

According to a seventh aspect of the present invention, there is provided a recording medium wherein a plurality of video signals representing pictures are recorded, and also there are recorded data relative to the time difference between the recording end hour of one picture and the recording start hour of the next picture.

Thus, in the recording medium, a plurality of video signals representing pictures are recorded with data relative to the time difference between the recording end hour of one picture and the recording start hour of the next picture, so that when the video signals are reproduced, predetermined video effects inclusive of fade-in, fade-out and so forth can be applied thereto on the basis of the data relative to the time difference.

In the present invention, the aforementioned object is achieved by detecting the time difference between the recording end hour of at least one picture recorded in a recording medium and the recording start hour of the next picture, and then applying a predetermined video effect to the video signal read out from the recording medium on the basis of the result of such detection.

According to an eighth aspect of the present invention, there is provided a picture reproducing apparatus comprising: a time difference detection means for detecting the time difference between the recording end hour of at least one picture recorded on a recording medium and the recording start hour of the next picture; a read means for reading out the video signals of the pictures recorded in the recording medium; a video effect generation means for applying a predetermined video effect to the read video signal; and an effect control means for controlling the video effect generation means in accordance with the detection result obtained from the time difference detection means.

And according to a ninth aspect of the present invention, there is provided a picture reproducing method comprising the steps of: detecting the time difference between the recording end hour of at least one picture recorded on a recording medium and the recording start hour of the next picture; and applying a predetermined video effect to the video signal of the picture read out from said recording medium in accordance with the detection result obtained with regard to the time difference.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the present invention will be described in detail with reference to the accompanying drawings.

Figure 1:
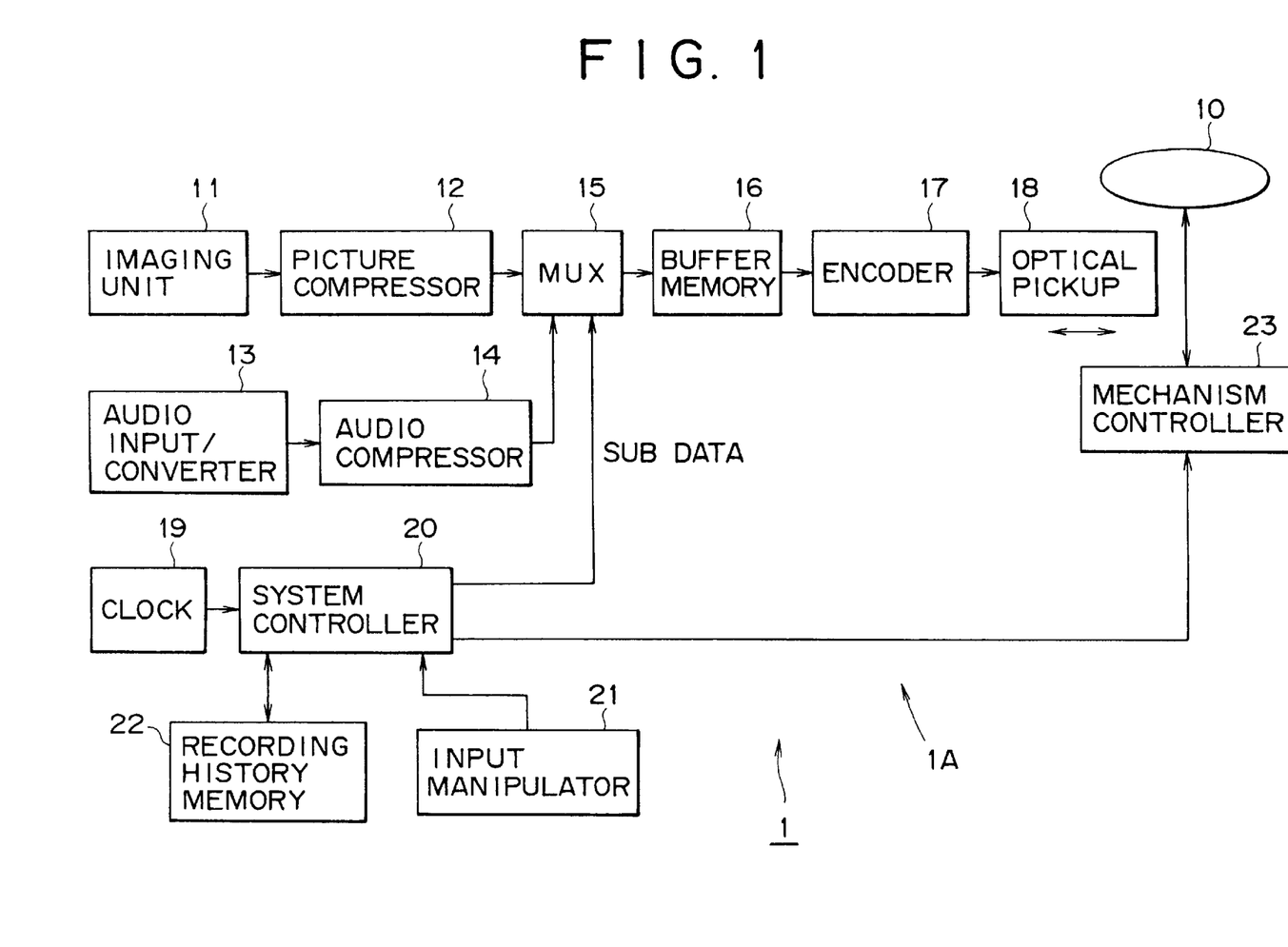
FIG. 1 is a block diagram showing an exemplary circuit configuration of a recording section in a picture recording/reproducing apparatus where the present invention is applied.
Figure 2:
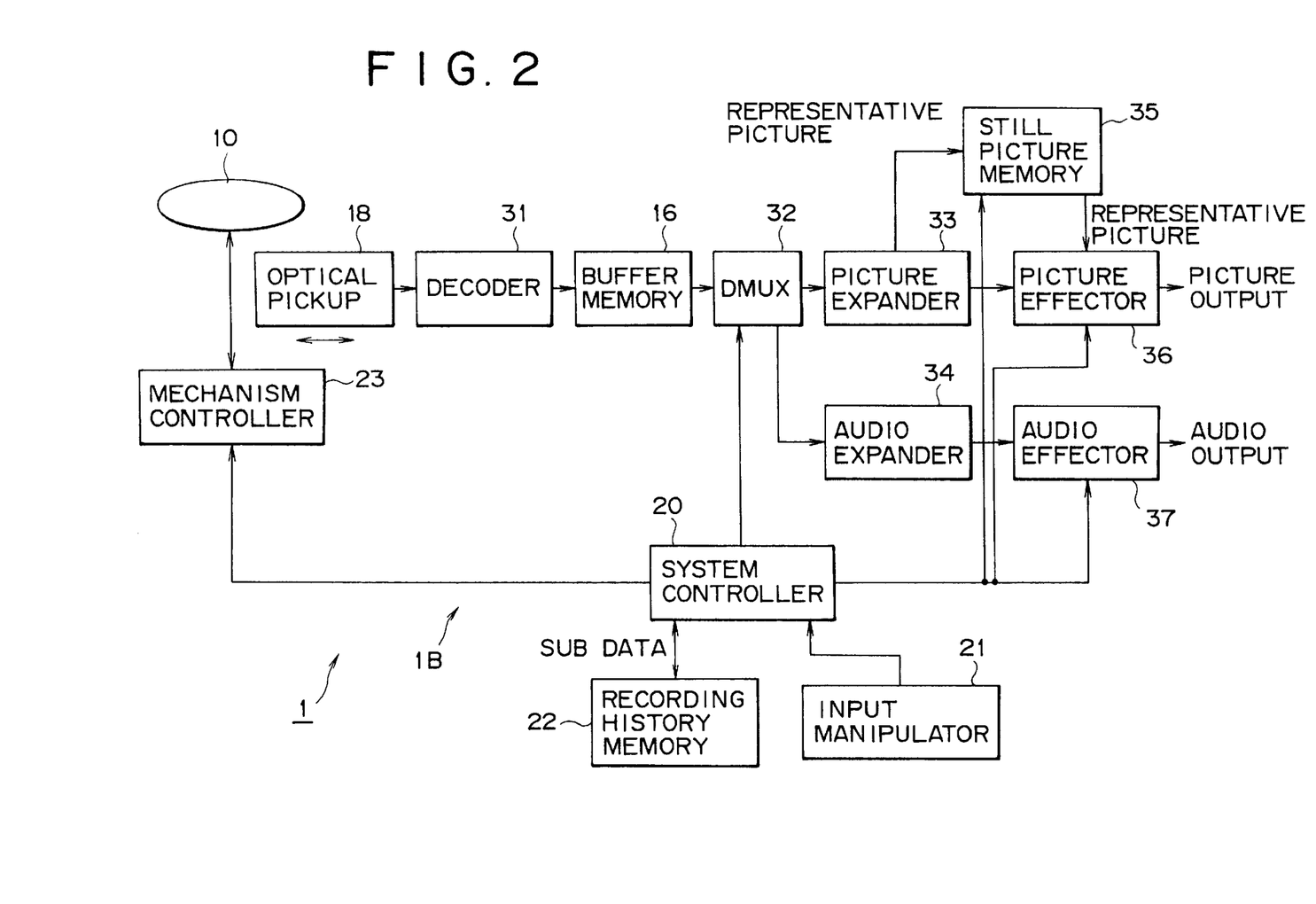
FIG. 2 is a block circuit diagram showing an exemplary circuit configuration of a reproducing section in the apparatus of FIG. 1.

FIGS. 1 and 2 are block diagrams showing circuit configurations of a recording section and a reproducing section, respectively, of a picture recording/reproducing apparatus 1, wherein common blocks used in both the recording and reproducing sections are denoted by common reference numerals. The picture recording/reproducing apparatus 1 is so contrived as to record still pictures and/or moving pictures and concomitant audio signals on a recording medium 10 and to reproduce the same therefrom. Its recording section 1A and reproducing section 1B are shown in FIGS. 1 and 2, respectively.

In this embodiment, a description will be given with regard to an example of using an optical disk as the recording medium 10. However, it is to be understood that the recording medium 10 may be any other disk-like recording medium such as a magnetic disk, or a tape-like recording medium such as a magnetic tape, or a semiconductor memory such as a flash memory.

Also in this embodiment, the recorded content corresponding to moving pictures and concomitant audio signals from a recording start hour to a recording end hour is defined as a "cut", and the recorded content corresponding to one still picture is defined as a "shot".

As shown in FIG. 1, the recording section 1A in the picture recording/reproducing apparatus 1 comprises an imaging unit 11 such as a video camera, a picture compressor 12, an audio input/converter 13, an audio compressor 14, a multiplexer (MUX) 15, a buffer memory 16, an encoder 17, an optical pickup section 18, a clock 19, a system controller 20, an input manipulator 21, a recording history memory 22, and a mechanism controller 23.

The imaging unit 11 consists of an unshown optical system, an imaging device such as CCD, an imaging circuit and so forth for generating image signals of a desired object and outputting the same as digital signals representative of its picture. The image signals thus generated by the imaging unit 11 are supplied to the image compressor 12.

The picture compressor 12 compresses the digital signals, which represent the picture supplied from the imaging unit 11, in conformity with a predetermined format. For such signal compression, there is adopted a standardized format conforming to, e.g., MPEG (Moving Picture coding Experts Group) or JPEG (Joint Photographic coding Experts Group).

The audio input/converter 13 consists of an unshown microphone, an amplifier, and A-D converter and so forth for inputting audio from an object or the like and outputting the received audio as digital signals. The audio signals obtained from the audio input/converter 13 are supplied to the audio compressor 14.

The audio compressor 14 compresses the digital signals, which represent the audio supplied from the audio input/converter 13, in conformity with a predetermined format. For such signal compression also, there is adopted a standard format conforming to the above-described MPEG or the like.

The MUX 15 generates serial data by packetizing the digital signals supplied from the picture compressor 12 and the audio compressor 14 respectively. Further the MUX 15 generates other serial data by packetizing sub data, which will be described later in detail, supplied from the system controller 20.

For execution of time control in transferring the data to the recording medium 10, the buffer memory 16 temporary stores the serial data obtained from the MUX 15 and then outputs the same to the encoder 17, whereby the serial data from the MUX 15 are transferred to the encoder 17 per sector of the recording medium 10.

The encoder 17 executes a process of encoding the data supplied from the buffer memory 16 for error correction thereof and another process of modulating the data to enhance the recording efficiency to the recording medium 10, and then supplies the processed data to the optical pickup section 18.

The optical pickup section 18 is equipped with an unshown recording/reproducing head whose operation is controlled by the undermentioned mechanism controller 23. And the optical pickup section 18 records the data supplied from the encoder 17 on the recording medium 10 by the use of such a recording/reproducing head.

The clock 19 supplies information relative to the specific date and hour (hereinafter referred to as hour data) to the system controller 20.

The input manipulator 21 has a plurality of unshown operation input buttons and so forth which are manipulated by a user to supply various input signals to the system controller 20.

The system controller 20 controls each circuit block in accordance with an operation input signal received from the input manipulator 21. More specifically, in response to a recording start command inputted from the input manipulator 21 when recording a moving picture and concomitant audio thereof, the system controller 20 outputs a control signal to each circuit block in such a manner that the moving picture signal and the audio signal inputted respectively from the imaging unit 11 and the audio input/converter 13 are recorded on the recording medium 10 by the recording/reproducing head of the optical pickup section 18 via the relevant circuit blocks.

In response to a recording end command inputted from the input manipulator 21, the system controller 20 outputs a control signal to each circuit block to terminate the recording process to the recording medium 10, thereby terminating the operation of recording the moving picture and audio signals on the recording medium 10 in the picture recording/reproducing apparatus 1.

Meanwhile, when recording a still picture, the system controller 20 outputs a control signal to each circuit block in response to a still picture recording command inputted from the input manipulator 21, thereby controlling the circuit blocks in a manner that the still picture signal inputted from the imaging unit 11 is recorded on the recording medium 10 by the recording/reproducing head of the optical pickup section 18 via the relevant blocks. And upon completion of recording the picture data on the recording medium 10, the system controller 20 outputs a control signal to each circuit block to terminate the control, hence completing the operation of recording the still picture on the recording medium 10 in the picture recording apparatus 1.

Further the system controller 20 generates a recording history file and a sequence file which will be described later in detail, then stores such files in the recording history memory 22 while supplying the same as the aforementioned sub data to the MUX 15, and controls each circuit block to record and update the data in the relevant area of the recording medium 10.

In response to a control signal received from the system controller 20, the mechanism controller 23 controls tracking of the recording/reproducing head in the optical pickup section 18, and further controls an unshown motor for driving the recording medium 10.

As shown in FIG. 2, the reproducing section 1B in the picture recording/reproducing apparatus 1 comprises the above optical pickup section 18, mechanism controller 23, a decoder 31, the above buffer memory 16, a demultiplexer (DMUX) 32, a picture expander 33, an audio expander 34, a still picture memory 35, a picture effector 36, an audio effector 37, and the above system controller 20, input manipulator 21 and recording history memory 22.

In the reproducing section 1B, the optical pickup section 18 reads out the data from the recording medium 10 by the recording/reproducing head and then outputs the read data to the decoder 31.

The decoder 31, which corresponds to the encoder 17 shown in FIG. 1, performs demodulation, decoding and error correction of the data supplied from the optical pickup section 18 and then supplies the processed data to the buffer memory 16.

In the reproducing section 1B, the buffer memory 16 temporarily stores the serial data obtained from the decoder 31 and then outputs the same to the DMUX 32, so as to execute time adjustment in transferring the data to the DMUX 32. Consequently, in the reproducing section 1B, the serial data from the decoder 31 are transferred to the DMUX 32 per sector of the recording medium 10 for example.

The DMUX 32, which corresponds to the MUX 15 shown in FIG. 1, demultiplexes the data supplied from the buffer memory 16 into video signal, audio signal and the aforementioned sub data. Thereafter the DMUX 32 outputs the video signal to the picture expander 33, the audio signal to the audio expander 34, and the sub data to the system controller 20, respectively. The sub data inclusive of the recording history file and the sequence file are stored in the recording history memory 22 via the system controller 20.

The picture expander 33 corresponding to the picture compressor 12 in FIG. 1 processes the video signal supplied from the DMUX 32 to obtain the baseband signal by expanding the input video signal in conformity with a predetermined format corresponding to the compression format of the picture compressor 12.

The audio expander 34 corresponding to the audio compressor 14 in FIG. 1 processes the audio signal supplied from the DMUX 32 to obtain the baseband signal by expanding the input audio signal in conformity with a predetermined expansion format corresponding to the compression format of the audio compressor 14.

The still picture memory 35 stores a specific picture temporarily when a special effect is to be applied to the picture. When applying fade-in or fade-out for example, a specific picture (hereinafter referred to as a representative picture) is read out from the picture expander 33 under control of the system controller 20 and then is stored temporarily in the still picture memory 35.

The picture effector 36 controls pictures to be outputted to an external apparatus on the basis of a control signal supplied from the system controller 20. For example, the picture effector 36 normally outputs the picture signal from the picture expander 33 as it is while applying a special effect to the picture signal supplied from the picture expander 33 under control of the system controller 20. In this embodiment, achievable special effects include fade-in, fade-out and insertion of a title picture. When applying a special effect such as fade-in, fade-out or the others, the picture effector 36 reads out the stored representative picture from the still picture memory 35 and outputs the picture signal of such representative picture while changing the gain thereof gradually.

As for other examples of special effects, it is possible to process a desired picture with mosaic, or to switch a picture in imitation of flat field, still picture or opening/closing of a door, or to scroll, zoom or rotate a picture. Such special effects can be applied either individually or in combination.

The audio effector 37 controls the audio output in accordance with a control signal from the system controller 20. For example, the audio effector 37 normally outputs the audio signal as it is directly from the audio expander 34 and, when applying a special effect such as fade-in or fade-out, outputs the audio signal while changing the gain thereof gradually. It is desired that such fade-in or fade-out be completed within a shorter time as compared with video fade-in or fade-out, hence realizing more natural switching of video contents in a reproduction mode.

The system controller 20 controls each circuit block in accordance with an operation input signal received from the input manipulator 21. More specifically, in the reproducing section 1B, the system controller 20 controls read-out and reproduction of signals from the recording medium 10, cue, review or pause in the reproduction mode, application of special effect during the reproduction, and further controls rewrite of the aforementioned sequence file and/or recording history file.

Next, a detailed explanation will be given on the recording history file and the sequence file generated by the system controller 20.

The system controller 20 forms a recording history file at the time of first recording an object on the recording medium 10 and describes, in the recording history file, the recording hour data with reference to the hour data supplied from the clock 19. More concretely, the system controller 20 generates hour data relative to the recording start hour and the recording end hour in the case of recording a cut, or generates hour data relative to the recording hour in the case of recording a shot, and describes such hour data in the recording history file. Further the system controller 20 generates a cut number (e.g., C1) indicative of the recorded cut or a shot number (e.g., S1) indicative of the recorded shot, and then describes such a cut or shot number in the recording history file. Moreover the system controller 20 describes, in the recording history file, address data which are recorded on the recording medium 10 with regard to the cut or shot.

In the recording section 1A of the picture recording/reproducing apparatus 1, a recording history file is stored in the recording history memory 22 at completion of the first recording of an object on the recording medium 10. This file includes the recording start date and hour and the recording end date and hour relative to the first cut, the cut number C1 and also the address of the cut on the recording medium 10; or the recording date and hour relative to the first shot, the shot number Si and also the address of the shot on the recording medium 10.

Figure 3:
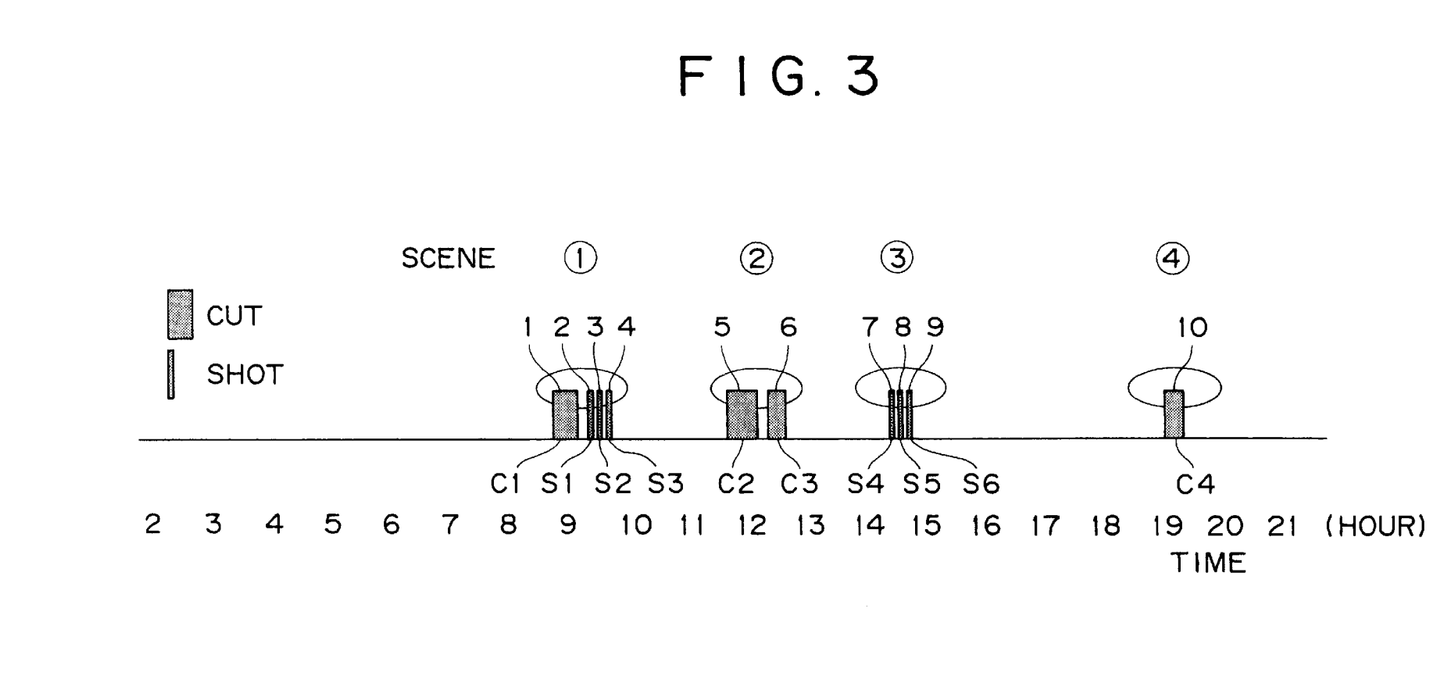
FIG. 3 is an explanatory diagram showing an exemplary recording history generated when still pictures and moving pictures are recorded by the apparatus of FIG. 1.

Upon completion of recording each cut or shot thereafter, the system controller 20 adds the new contents of description to the recording history file stored in the recording history memory 22, thereby updating the data. Consequently, as shown in FIG. 3 for example where four cuts and six shots have been recorded during a time period from the hour slightly before 9:00 to the hour slightly after 19:00, the system controller 20 successively generates cut numbers C1, C2, C3, C4 relative to the four cuts and also generates shot numbers S1, S2, S3, . . . , S6 relative to the six shots. Then the system controller 20 successively describes the data of such generated cut numbers and shot numbers in the recording history file together with the aforementioned hour data and addresses, whereby the cut numbers and/or shot numbers are stored in the recording history file in the recording order of moving pictures and/or still pictures, as shown in FIG. 3.

In this embodiment, when the recording interval between moving pictures and/or still pictures becomes longer than a predetermined time period, i.e., when no data of any moving picture and/or still picture is recorded on the recording medium 10 for more than a predetermined time period, a group of cuts and shots where each recording interval is within the predetermined time period is defined as a "scene". In the case of FIG. 3 for example, a total of ten cuts and shots are recorded during the time period approximately from 9:00 to 19:00, and supposing now that the predetermined time period relative to the aforementioned scene is 30 minutes, it follows that the recorded cuts and shots are divided into four scenes. More specifically, the system controller 20 compares the recording end hour/recording hour of one cut/shot with the recording start hour/recording hour of the next cut/shot, then detects whether the time difference therebetween is more than a predetermined time period (30 minutes in this example), and makes a decision as to whether or not to generate a new scene. Thereafter the system controller 20 gives a scene number to each generated new scene and describes data relative to the scene No. in the recording history file. Further the system controller 20 controls each circuit block in a manner that the recording history file subsequent to addition of the scene number is recorded or updated in the relevant area of the recording medium 10 as required.

Figure 4:
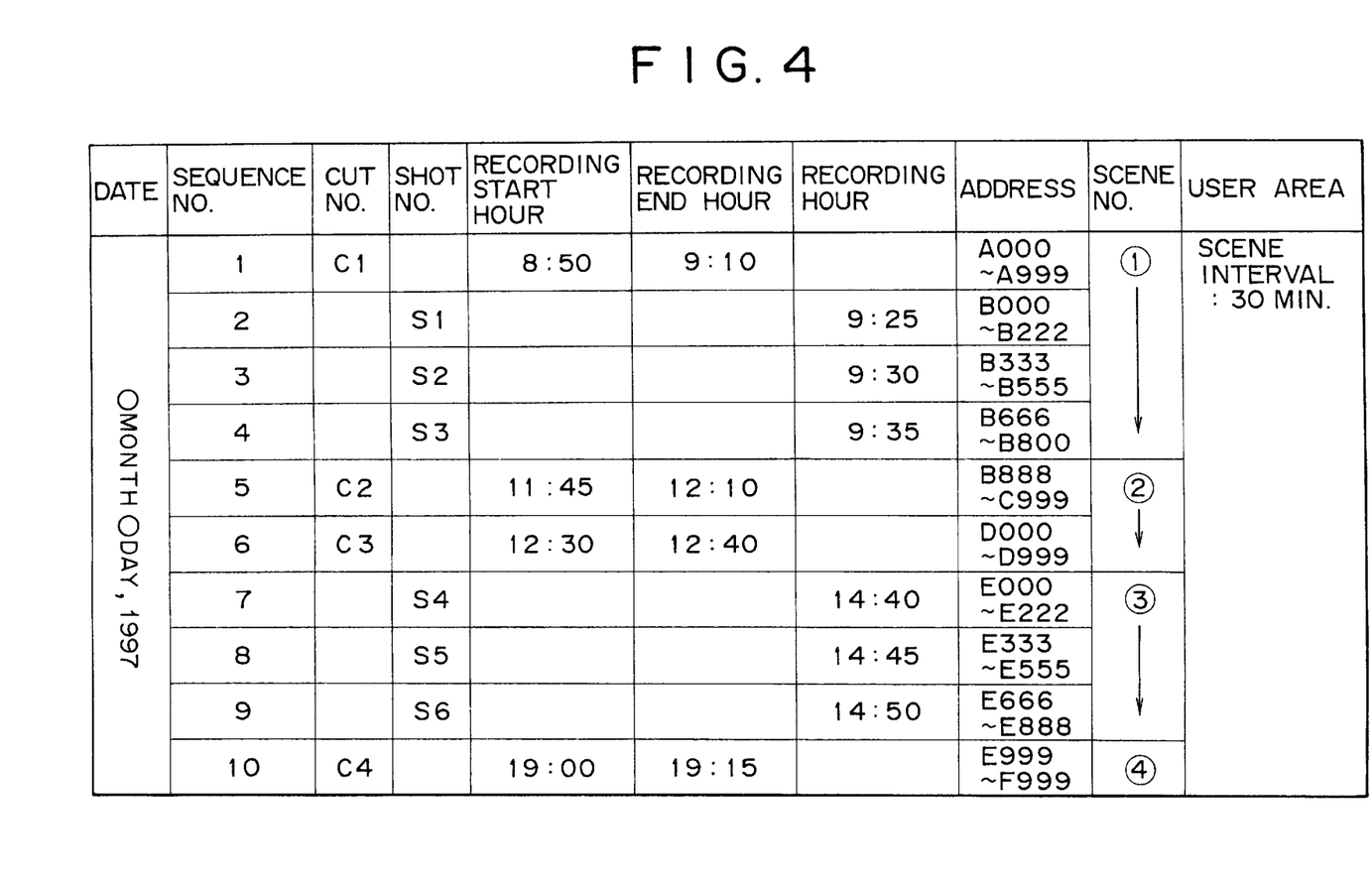
FIG. 4 shows an exemplary recording history file.

FIG. 4 shows an exemplary recording history file formed by the system controller 20 in the above case of FIG. 3. In this recording history file, various columns are existent for recording a shooting date, sequence numbers indicative of the shooting order, cut numbers, shot numbers, recording start hours and end hours in the cuts, recording hours in the shots, addresses on the recording medium where the cuts or shots are stored, scene numbers, and a user area. And the respective data are described in associated columns.

In the user area, content for changing the partition of scenes is described if necessary. For example, when a predetermined time period with regard to each scene is set to 30 minutes in the initial state, a description of "Scene interval: 30 minutes" is recorded in the user area, as shown in FIG. 4. When the predetermined time period is changed to any user's desired length by a manipulation of the relevant button in the input manipulator 21, the content of such change is also described in the user area.

In the recording section 1A of the picture recording/reproducing apparatus 1 where recording hours and so forth are rarely skipped on the whole, the configuration may be so modified that, when no subsequent scene is generated inclusive of scene No. 2 for example, the system controller 20 divides the predetermined time period of the scene into a proper number of scenes by changing the time period automatically to less than 30 minutes, and then stores any generated scene numbers in the recording history memory 22. In this case also, the content thereof is described in the user area.

Further, when moving pictures are recorded continuously without an interruption or a plurality of still pictures are recorded successively without a pause in the picture recording/reproducing apparatus 1, it is possible for the user to partition the pictures forcibly into scenes by manipulating the relevant button in the input manipulator 21. In this case also, the content thereof is described in the user area. When the compression format is based on the MPEG standard, deterioration of the picture quality can be prevented by partitioning the pictures in consideration of GOP (Group Of Pictures) as a unit.

At the first time of recording the object on the recording medium 10, the system controller 20 generates a sequence file (not shown) together with the aforementioned recording history file. In the sequence file, there are described contents of reproducing the data in the order of scene numbers and applying a video effect such as fade-in or fade-out at the seam or change of scenes. This sequence file also has a user area to describe contents, such as skipping any specific scene or switching the scene order if required.

In the recording mode, the recording history file and the sequence file are both stored in the recording history memory 22. And every time such files are generated or updated, the files are recorded or updated as sub data in a predetermined area of the recording medium 10. Subsequently in the reproduction mode, the sub data composed of such sequence file and recording history file are read out from the recording medium 10 prior to reproduction of pictures and so forth and then are stored in the recording history memory 22, so that the system controller 20 controls reproduction in accordance with the contents of such files.

Figure 5:
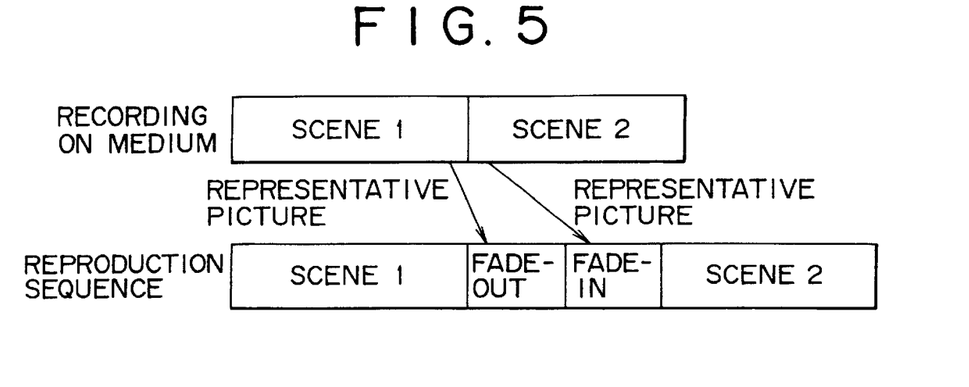
FIG. 5 is an explanatory diagram illustrating how fade-in and fade-out processes are executed in the apparatus of FIG. 1.

Hereinafter an explanation will be given on a concrete process executed in the reproduction mode in the picture recording/reproducing apparatus 1. When applying a special effect to a reproduced picture, the reproducing section 1B of the picture recording/reproducing apparatus 1 previously extracts the representative picture at the end of one scene and the representative picture at the start of a next scene, and stores the extracted pictures in the still picture memory 35. Thereafter, when a special effect is applied to execute fade-out at the end of scene 1 and fade-in at the start of scene 2 for example as shown in FIG. 5, the system controller 20 controls the still picture memory 35 and the picture effector 36 in a manner to output the picture signals relative to the respective representative pictures of scene 1 and scene 2 while gradually varying the gains thereof.

Figure 6:
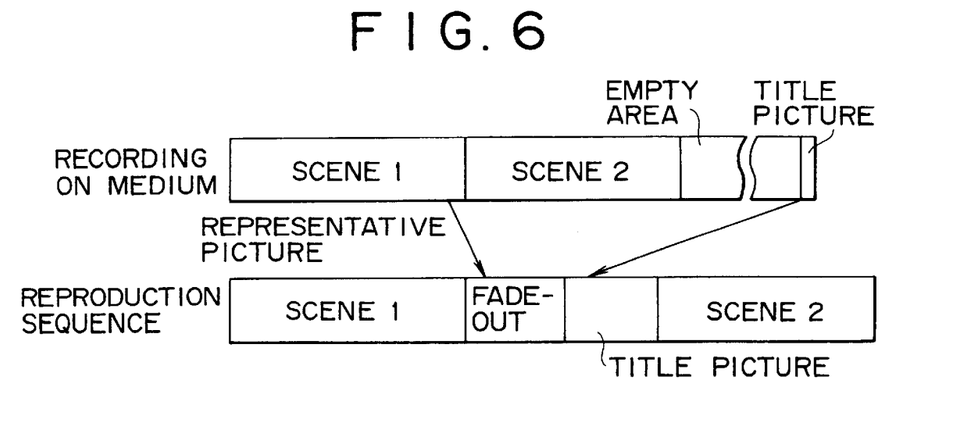
FIG. 6 is an explanatory diagram illustrating how a title picture is reproduced in succession to fade-out in the apparatus of FIG. 1.

In another case of FIG. 6 where a special effect is applied in the reproduction mode to execute fade-out at the end of scene 1 for example and the title picture of scene 2 is displayed prior to start of scene 2, the image signal of the still or moving picture relative to the title picture of scene 2 is previously recorded in the relevant area on the recording medium 10. In this case, the title picture is recorded in the last portion of the data storage area on the recording medium 10. And the system controller 20 previously extracts the representative picture of scene 1 and the title picture thereof and then stores the same in the still picture memory 35. And when applying a special effect in the reproduction mode, the system controller 20 controls the still picture memory 35 and the picture effector 36 in a manner to output the representative picture of scene 1 while gradually lowering the gain of its picture signal and to display the title picture for a fixed time.

Figure 7:
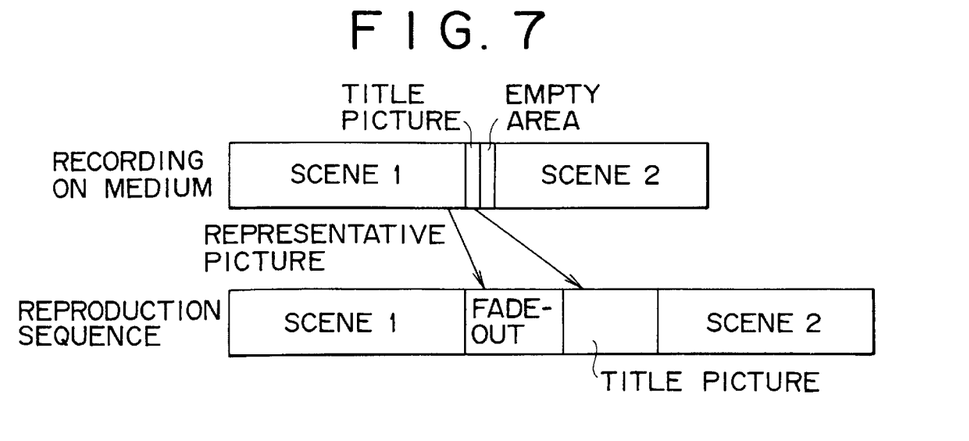
FIG. 7 is an explanatory diagram illustrating how an area for recording a title picture on a recording medium is secured previously in a recording mode so as to reproduce the title picture in succession to fade-out in the apparatus of FIG. 1.

In general, it is usual that, in most cases, a title picture is inserted in a seam of scenes. Therefore, when a special effect of fade-out is to be applied with the title picture, the system controller 20 may control each circuit block in such a manner that, as shown in FIG. 7, the area for recording the title picture on the recording medium 10 is previously ensured between scenes in the recording mode and, after completion of recording the title picture, the still picture signal relative to the title picture is recorded in this area on the recording medium. In this case, the operation of reading the title picture in the reproduction mode can be performed smoothly to thereby reduce the burden on the mechanism controller 23.

Due to the processing mentioned above, a video effect of fade-out, fade-in or the like is applied at a change of scenes in the picture recording/reproducing apparatus 1, so that the process of reproduction is executed in conformity with the sense of the user as a shooter, hence achieving wide reduction of incongruous feeling in the reproduction.

In case the recorded contents are such as those shown in FIG. 3, it is presumed that scene 1, scene 2, scene 3 and scene 4 were shot in different places since these scenes were shot in different time zones, and also that cut C1 and shots S1 to S3 constituting scene 1 for example were shot in the same place. According to the picture recording/reproducing apparatus 1, the reproduced pictures obtained in this case are processed with predetermined video effect at every change of shooting places by applying fade-out to shot 3 of scene 1, fade-in at the start of cut C2 of scene 2, fade-out at the end of cut C3 and so forth, whereby the reproduced pictures are conformed with the shooter's intention to consequently realize wide reduction of incongruous impression in the reproduction.

Since each scene described above is a unit easily graspable by a user, the system controller 20 in the picture recording/reproducing apparatus 1 is rendered capable of executing undermentioned various control actions by the use of such unitary scenes.

For example, if the system controller 20 controls each circuit block in a manner to achieve skipped reproduction per scene number, search of pictures in the reproduction mode can be performed with remarkable facility. Particularly when many still pictures such as several thousands of them for example are recorded on the recording medium 10, it is practically impossible to search all pictures one by one successively. In such a case, if the pictures are searched in the order of scene numbers, it becomes possible to widely reduce the labor and time required for search. In addition, search in the reproduction mode can further be facilitated by controlling to display the title picture of each scene described with reference to FIGS. 6 and 7.

Further the system controller 20 is capable of executing any of various editing processes per scene. For example, it is possible to delete or mask any of the scenes which are recorded on the recording medium 10 but are not required any longer to be watched again.

When the remaining quantity of the data storage area on the recording medium 10 is decreased and a new recording area is to be ensured by partially erasing the recorded contents, any unnecessary contents may be controlled to erase per scene to thereby ensure a continuous area while preventing erroneous erasure.

In editing the data through dubbing thereof by the use of another picture recording/reproducing apparatus or a computer, the editing can be performed with remarkable facility by execution of such process per scene. For example, rough editing can be accomplished merely by designating a desired scene number to be dubbed.

When transferring a reproduced signal from the picture recording/reproducing apparatus 1 to another apparatus via a digital interface, it is generally necessary that, due to the relation to the transfer rate, the reproduced picture signal and so forth be transferred in the compressed state. In this case, the system controller 20 transfers a command for a video effect together with the compressed picture signal and so forth from the DMUX 32, thereby enabling another apparatus on the receiving side to execute a concrete process for the video effect. During application of the video effect on the receiving side, the system controller 20 of the picture recording/reproducing apparatus 1 on the transmitting side controls each circuit block in compliance with the operation on the receiving side, like interrupting the reproduction temporarily. Since possible kinds of video effects are considered to be limitless, the system controller 20 may perform its control action in a manner to download algorithms or parameters relative to video effects via the recording medium 10 or the digital interface.

Thus, in the picture recording/reproducing apparatus 1, search and editing are executed in units of scenes, so that comfortable and simplified operability can be attained reflecting the feeling of the user or shooter. More specifically, according to the picture recording/reproducing apparatus 1, it is possible to eliminate the necessity of troublesome manipulations inclusive of setting by the fader button in the recording mode. Further in this picture recording/reproducing apparatus 1, none of pictures of spaced contents (both temporally and spatially) are reproduced in succession to consequently reduce incongruous feeling in the reproduction. Also according to this picture recording/reproducing apparatus 1, substantially edited reproduction is possibly rendered automatically without the necessity of any large-scale preparation for editing with dubbing executed in the related art by the use of two picture recording/reproducing apparatus and a picture effector after completion of the recording as mentioned. Besides the above, in this picture recording/reproducing apparatus 1, individually numbered scenes are recorded in the form of a file on the recording medium 10, so that even after completion of the recording, editing with skipped reproduction per scene or with deletion per scene can be accomplished simply and easily for the user by changing the user area in the recording history file or the sequence file.

In general, the process of forming a fade-in or fade-out picture belongs to a technically difficult category in execution of picture compression according to the MPEG standard or the like, and since frequent failure occurs in predicting the motion, the image quality is deteriorated by such failure in prediction of the motion. However, in this picture recording/reproducing apparatus 1 where such pictures need not be recorded, the quality of the reproduced picture can be enhanced in executing fade-in and fade-out. Further according to the picture recording/reproducing apparatus 1, no recording is performed during the time allocated for fade-in and fade-out, thereby saving the recording capacity of the recording medium 10. Moreover, reproduction of moving pictures can be temporarily interrupted at the seam of scenes, so that the place recorded in each scene or the title picture recorded in any spaced area on the recording medium 10 of FIG. 5 can be read in by controlling the mechanism controller 23 under control of the system controller 20 during such temporary interruption, hence reducing the burden on fast response of the mechanism controller 23.

In the recording section 1A of the picture recording/reproducing apparatus 1, an image signal representing the picture of an object is formed by the imaging unit 11, then the time difference between the hour of generation of such image signal and the hour of generation of the preceding image signal is detected by the system controller 20, and the image signal obtained from the imaging unit 11 and predetermined data based on the result of detection of the time difference from the system controller 20 are recorded on the recording medium 10 via the optical pickup section 18. Thereafter in the reproducing section 1B, the predetermined data relative to the time difference between the recording end hour of one picture and the recording start hour of the next picture are read out together with the video signal thereof from the recording medium 10 via the optical pickup section 18, and while the picture effector 36 is controlled by the system controller 20, a predetermined video effect is applied to the video signal read out on the basis of the predetermined data relative to the time difference. However, a modification thereof may be so contrived that, in the recording section 1A, merely the hour information is recorded as a time stamp of the recording picture without detecting the time difference or recording the predetermined data based on the result of such detection, and in the reproducing section 1B, predetermined data relative to the time difference between the recording end hour of one picture and the recording start hour of the next picture are generated by the system controller 20, and then the picture effector 36 is controlled in accordance with such data. In this modification also, it is possible to apply a desired video effect to the video signal read out from the recording medium on the basis of the predetermined data relative to the time difference.

In the recording mode, the recording section 1A operates the system controller 20 to write the shooting start hour and the shooting end hour of each cut in a moving picture or the shooting hour in a still picture as a time stamp in a management file.

And in the reproduction mode, the reproducing section 1B reads out a management file and operates the system controller 20 to calculate the following time periods on the basis of the time stamp in the management file.

(1) Time period from shooting end hour of one moving picture to shooting start hour of next moving picture;

(2) Time period from shooting end hour of one moving picture to shooting hour of next still picture;

(3) Time period from shooting hour of one still picture to shooting start hour of next moving picture;

(4) Time period from shooting hour of one still picture to shooting hour of next still picture.

The scene number is increased at each time point posterior to a preset time interval as a partition of scenes, and the settled new scene number is written in the management file. Then a recording history file and a sequence file are generated by the use of such management file where the scene numbers are thus written, so that the recorded data are reproduced in the order of the above scene numbers, and a desired video effect such as fade-in or fade-out can be applied at a seam or change of scenes.

In the reproducing section 1B, the system controller 20 determines scene numbers by the method mentioned, so that in the reproducing mode, any scene number can be redetermined by changing the preset time interval. This method is adaptable in the recording mode as well, and any scene numbers determined in the recording mode can be changed in the reproduction mode.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention. The scope of the invention, therefore, is to be determined solely by the appended claims.

What is claimed is:

1. A picture recording apparatus comprising:
   imaging means for generating a continuous current image signal;
   time difference detection means for detecting a time difference between a generation time of the current image signal and a generation time of a preceding image signal, wherein the generation times of the- current image signal and the preceding image signal are distinct actual times;
   data generating means for generating predetermined data based upon said detected time difference; and
   recording means for recording, on a recording medium, the image signal obtained from said imaging means and also said predetermined data.

2. The picture recording apparatus according to claim 1, wherein said time difference detection means determines whether the time difference is within a predetermined time period or not, and said predetermined data is generated based upon the result of the determination by said time difference detection means.

3. The picture recording apparatus according to claim 2, further comprising setting means for setting said predetermined time period.

4. The picture recording apparatus according to claim 2, wherein said predetermined data indicates that the time difference is not within the predetermined time period.

5. A picture recording method comprising the steps of:
   generating a continuous current image signal;
   detecting a time difference between a generation time of the current image signal and a generation time of a preceding image signal, wherein the generation times of the current image signal and the preceding image signal are distinct actual times;
   generating predetermined data based upon said detected time difference; and
   recording, on a recording medium, the generated image signal and also said predetermined data.

6. The picture recording method according to claim 5, further comprising the steps of:
   determining whether the detected time difference is within a predetermined time period; and
   generating said predetermined data based upon said determination, said predetermined data defining, as one continuous scene, a group of pictures where said time difference is within the predetermined time period.

7. The picture recording method according to claim 6, further comprising the step of setting the predetermined time period.

8. The picture recording method according to claim 6, further comprising the step of recording data on said recording medium indicating that the time difference is not within the predetermined time period.

9. A picture reproducing apparatus comprising:
   read means for reading, from a recording medium, predetermined data relative to the time difference between a recording time end of at least one continuously recorded picture and a recording time start of a next continuously recorded picture, together with the video signal of the pictures, wherein the recording times are the distinct actual times at which the end and the start of the at least one picture and the next picture, respectively, are recorded;
   video effect generation means for applying a predetermined video effect to the read video signal; and
   effect control means for controlling said video effect generation means in accordance with the predetermined data relative to the time difference.

10. The picture reproducing apparatus according to claim 9, wherein said predetermined data indicates whether or not the time difference is within a predetermined time period; and
   said effect control means controls said video effect generation means on the basis of said predetermined data.

11. The picture reproducing apparatus according to claim 10, wherein said predetermined data defines, as one continuous scene, a group of pictures where the time difference is within the predetermined time period.

12. The picture reproducing apparatus according to claim 9, wherein said effect control means determines whether or not the time difference is within the predetermined time period, and when it is determined that the time difference is not within the predetermined time period, said effect control means controls said video effect generation means to apply a predetermined video effect between reproduction of said at least one picture and reproduction of said next picture.

13. The picture reproducing apparatus according to claim 12, further comprising setting means for setting the predetermined time period.

14. The picture reproducing apparatus according to claim 12, wherein said effect control means controls said video effect generation means to cause a fade-out at the end of each continuous scene composed of a group of pictures where the time difference is within a predetermined time period, and to cause a fade-in at the start of a next scene.

15. The picture reproducing apparatus according to claim 14, wherein said effect control means controls said video effect generation means to extract the picture at the end of each scene and the picture at the start of the next scene, and then to change a gain of each of the extracted pictures.

16. The picture reproducing apparatus according to claims 9, further comprising an audio effect generation means for applying a predetermined audio effect to an audio signal read out from the recording medium by said read means, wherein said effect control means controls said audio effect generation means on the basis of the predetermined data relative to said time difference.

17. A picture reproducing method comprising the steps of:

reading, from a recording medium, predetermined data relative to the time difference between a recording end time of one continuously recorded picture and a recording start time of a next continuously recorded picture, together with the video signal of the pictures, wherein the recording times are the distinct actual times at which the end and the start of the one picture and the next picture, respectively, are recorded; and applying a predetermined video effect to the read image signal in accordance with the predetermined data relative to the time difference.

18. The picture reproducing method according to claim 17, further comprising the steps of:

determining whether or not the time difference is within a predetermined time period based upon said predetermined data; and applying predetermined video effect to the read image signal on the basis of said predetermined data.

19. The picture reproducing method according to claim 18, further comprising the step of applying a predetermined video effect to the read image signal on the basis of the predetermined data that define, as one continuous scene, a group of pictures where the time difference is within the predetermined time period.

20. The picture reproducing method according to claim 17, further comprising the steps of:

determining whether or not the time difference is within the predetermined time period; and applying a predetermined video effect between reproduction of said one picture and reproduction of said next picture when the determination indicates that the time difference is not within the predetermined time period.

21. The picture reproducing method according to claim 20, further comprising the step of setting the predetermined time period.

22. The picture reproducing method according to claim 20, further comprising the step of applying a video effect to cause a fade-out at the end of each continuous scene composed of a group of pictures where the time difference is within a predetermined time period, and to cause a fade-in at the start of a next scene.

23. The picture reproducing method according to claim 22, further comprising the step of applying said video effect by extracting the picture at the end of each scene and the picture at the start of the next scene, and then changing a gain of each of the extracted pictures.

24. The picture reproducing method according to claim 17, further comprising the steps of:

reading out an audio signal from said recording medium; and applying a predetermined audio effect to the read audio signal on the basis of the predetermined data.

25. A picture recording/reproducing apparatus comprising:

imaging means for forming a continuous image signal;

time difference detection means for detecting a time difference between a generation time of the image signal and a generation time of a preceding image signal, wherein the generation times of the image signal and the preceding image signal are distinct actual times;

data generating means for generating predetermined data based upon said detected time difference;

recording means for recording, on a recording medium, the image signal obtained from said imaging means and also said predetermined data;

read means for reading, from said recording medium, the predetermined data together with the image signal;

video effect generation means for applying a predetermined video effect to the image signal thus read; and effect control means for controlling said video effect generation means in accordance with the predetermined data.

26. The picture recording/reproducing apparatus according to claim 25, wherein said time difference detection means determines whether or not the time difference is within a predetermined time period, and said predetermined data is generated based upon the result of such determination.

27. The picture recording/reproducing apparatus according to claim 26, further comprising setting means for setting said predetermined time period.

28. The picture recording/reproducing apparatus according to claim 26, wherein said predetermined data indicates that the time difference is not within the predetermined time period.

29. The picture recording/reproducing apparatus according to claim 25, wherein said read means reads out, from the recording medium, predetermined data indicating whether or not the time difference is within a predetermined time period.

30. The picture recording/reproducing apparatus according to claim 29, wherein said predetermined data defines, as one continuous scene, a group of pictures where the time difference is within the predetermined time period.

31. The picture recording/reproducing apparatus according to claim 25, wherein said effect control means determines whether or not the time difference is within the predetermined time period, and when the result of the determination indicates that the time difference is not within the predetermined time period, said effect control means controls said video effect generation means to apply a predetermined video effect between reproduction of said preceding image signal and reproduction of said image signal.

32. The picture recording/reproducing apparatus according to claim 31, further comprising setting means for setting the redetermined time period.

33. The picture recording/reproducing apparatus according to claim 31, wherein said effect control means controls said video effect generation means to cause a fade-out at the end of each continuous scene composed of a group of pictures where the time difference is within a predetermined time period, and to cause a fade-in at the start of a next scene.

34. The picture recording/reproducing apparatus according to claim 33, wherein said effect control means controls said video effect generation means to extract a picture at the end of each scene and a picture at the start of the next scene, and to change a gain of each of the extracted pictures.

35. The picture recording/reproducing apparatus according to claim 25, further comprising an audio effect generation means for applying a predetermined audio effect to an audio signal read out from the recording medium by said read means, wherein said effect control means controls said audio effect generation means on the basis of said predetermined data.

36. A picture recording/reproducing method comprising the steps of:
   generating a continuous current image signal;
   detecting a time difference between a generation time of the current image signal and a generation time of a preceding image signal, wherein the generation times of the current image signal and the preceding image signal are distinct actual times;
   generating predetermined data based upon said detected time difference;
   recording, on a recording medium, the generated current image signal and said predetermined data;
   reading the predetermined data from the recording medium together with the current image signal; and
   applying a predetermined video effect to the read image signal in accordance with said predetermined data.

37. The picture recording/reproducing method according to claim 36, further comprising the steps of:
   determining whether or not the detected time difference is within a predetermined time period; and
   generating the predetermined data defining, as one continuous scene, a group of pictures where the time difference is within the predetermined time period.

38. The picture recording/reproducing method according to claim 37, further comprising the step of setting the predetermined time period.

39. The picture recording/reproducing method according to claim 37, further comprising the step of recording predetermined data indicating that the time difference is not within the predetermined time period.

40. The picture recording/reproducing method according to claim 36, further comprising the step of:
   reading, from the recording medium, the predetermined data indicating that the time difference is within a predetermined time period.

41. The picture recording/reproducing method according to claim 40, wherein said predetermined data define, as one continuous scene, a group of the pictures where the time difference is within the predetermined time period.

42. The picture recording/reproducing method according to claim 36, further comprising the steps of:
   determining whether or not the time difference is within the predetermined time period; and
   applying a predetermined video effect between reproduction of said current image signal and reproduction of said preceding image signal when the time difference is not within the predetermined time period.

43. The picture recording/reproducing method according to claim 42, further comprising the step of setting the predetermined time period.

44. The picture recording/reproducing method according to claim 42, further comprising the step of applying a video effect to cause a fade-out at the end of each continuous scene composed of a group of pictures where the time difference is within a predetermined time period, and to cause a fade-in at the start of a next scene.

45. The picture recording/reproducing method according to claim 44, further comprising the steps of:
   applying said video effect by extracting a picture at the end of each scene and a picture at the start of the next scene; and
   changing a gain of each of the extracted pictures.

46. The picture recording/reproducing method according to claim 36, further comprising the steps of:
   reading out an audio signal from said recording medium; and
   applying a predetermined audio effect to the read audio signal on the basis of the predetermined data.

47. A recording medium for use with a data processor and on which a plurality of video signals representing pictures are recorded, along with data relative to a difference between the recording end time of at least one continuously recorded picture and the recording start time of a next continuously recorded picture, said video signals and said data being used by said data processor, wherein the recording times are the distinct actual times at which the end and the start of the at least one picture and the next picture, respectively, are recorded.

48. The recording medium according to claim 47, wherein said data indicates that said time difference is within a predetermined time period.

49. The recording medium according to claim 48, wherein a scene number is recorded for each continuous scene, each scene being defined as a group of pictures where the time difference is within the predetermined time period.

50. A picture reproducing apparatus comprising:
   time difference detection means for detecting a time difference between a recording end time of at least one continuously recorded picture recorded on a recording medium and a recording start time of a next continuously recorded picture, wherein the recording times are the distinct actual times at which the end and the start of the at least one picture and the next picture, respectively, are recorded;
   read means for reading out a video signal corresponding to each of the pictures recorded in said recording medium;
   video effect generation means for applying a predetermined video effect to the read video signals; and
   effect control means for controlling said video effect generation means in accordance with the detection result obtained from said time difference detection means.

51. The picture reproducing apparatus according to claim 50, wherein said effect control means controls said video effect generation means on a scene-by-scene basis, each continuous scene including a group of pictures where the time difference detected by said time difference detection means is within the predetermined time period.

52. The picture reproducing apparatus according to claim 51, wherein said effect control means controls said video effect generation means to extract a picture at the end of each scene and a picture at the start of the next scene, and to change a gain of each of the extracted pictures.

53. The picture reproducing apparatus according to claim 52, wherein said effect control means controls said video effect generation means to cause a fade-out at the end of each scene and to cause a fade-in at the start of the next scene.

54. The picture reproducing apparatus according to claim 50, wherein said effect control means determines whether or not the time difference is within the predetermined time period, and when the time difference is not within the predetermined time period, said effect control means controls said video effect generation means to apply a predetermined video effect between reproduction of said at least one picture and reproduction of the next picture.

55. The picture reproducing apparatus according to claim 54, further comprising setting means for setting the predetermined time period.

56. The picture reproducing apparatus according to claim 50, further comprising audio effect generation means for applying a predetermined audio effect to an audio signal read out from the recording medium by said read means, wherein said effect control means controls said audio effect generation means on the basis of the detection result obtained from said time difference detection means.

57. A picture reproducing method comprising the steps of:
 detecting a time difference between a recording end time of at least one continuously recorded picture recorded on a recording medium and the recording start time of a next continuously recorded picture, wherein the recording times are the distinct actual times at which the end and the start of the at least one picture and the next picture, respectively, are recorded; and
 applying a predetermined video effect to the video signal of the picture read out from said recording medium in accordance with the detection result obtained with regard to the time difference.

58. The picture reproducing method according to claim 57, further comprising the step of applying a predetermined video effect to the video signal of the picture read out from said recording medium for each continuous scene, each scene including a group of pictures where the detected time difference is within the predetermined time period.

59. The picture reproducing method according to claim 58, further comprising the steps of:
 extracting a picture at the end of each scene and a picture at the start of the next scene; and
 changing a gain of each of the extracted pictures.

60. The picture reproducing method according to claim 59, further comprising the step of applying a video effect to cause a fade-out at the end of each scene and to cause a fade-in at the start of the next scene.

61. The picture reproducing method according to claim 57, further comprising the steps of:
 determining whether or not the detected time difference is within a predetermined time period; and
 applying a predetermined video effect between reproduction of said at least one picture and reproduction of the next picture when the time difference is not within the predetermined time period.

62. The picture reproducing method according to claim 61, further comprising the step of setting said predetermined time period.

63. The picture reproducing method according to claim 57, further comprising the step of applying a predetermined audio effect to an audio signal read but from the recording medium on the basis of the detection result obtained with regard to said time difference.

* * * * *